United States Patent [19]

Jayawant

[11] 4,419,246

[45] Dec. 6, 1983

[54] REMOVAL OF HEAVY METAL IONS

[75] Inventor: Madhusudan D. Jayawant, Hockessin, Del.

[73] Assignee: E. I. Du Pont de Nemours & Co., Wilmington, Del.

[21] Appl. No.: 430,879

[22] Filed: Sep. 30, 1982

[51] Int. Cl.³ .............................. C02F 1/52; C02F 1/72
[52] U.S. Cl. ..................... 210/721; 210/722; 210/724; 210/759; 210/912; 423/43; 423/144
[58] Field of Search ............... 210/721, 724, 912, 759, 210/722, 726, 758, 913, 914; 75/108, 109, 117, 119; 423/140, 142, 144, 43

[56] References Cited

U.S. PATENT DOCUMENTS

| | | | |
|---|---|---|---|
| 3,816,593 | 6/1974 | Johnson et al. | 423/140 |
| 4,332,687 | 6/1982 | Daignault | 210/721 |
| 4,333,913 | 6/1982 | Dotson et al. | 210/721 |

FOREIGN PATENT DOCUMENTS

| | | | |
|---|---|---|---|
| 51-10176 | 1/1976 | Japan | 210/912 |
| 51-99854 | 9/1976 | Japan | 210/912 |
| 55-37311 | 9/1980 | Japan | 210/724 |
| 55-116489 | 9/1980 | Japan | 210/722 |

OTHER PUBLICATIONS

Friedlander G. D.; "Hydrogen Peroxide Cleans Boiler Waste"; *Electrical World*, Aug. 15, 1979.

*Primary Examiner*—Benoît Castel

[57] ABSTRACT

Heavy metal ions bonded to complexing agent can be precipitated from waste streams with a combination of a magnesium ion, calcium hydroxide and peroxygen compound.

15 Claims, No Drawings

REMOVAL OF HEAVY METAL IONS

BACKGROUND OF THE INVENTION

1. Technical Field

This invention relates to the removal of heavy metal ions from waste and process streams. More particularly, it relates to the precipitation and removal from waste streams of iron, copper and nickel ions which have become bonded to organic complexing agents.

2. Background Art

Steam boilers from power plants need to have periodic internal cleaning and removal of heavy metal oxide or rust sediment to prevent corrosion and maintain efficiency. The cleaning solutions are composed of powerful organic complexing agents such as ethylenediaminetetraacetic acid, citric acid, etc. These complexing agents clean the boilers and in particular remove the metal oxide rust and scales by water soluble complex formation. Aqueous waste from the boiler cleaning now, however, contains heavy metal ions, expecially, iron, copper and nickel, in complexed form and it becomes nearly impossible to precipitate out last traces of these metal ions by expected conventional means such as increasing the pH of the waste solution with sodium or calcium hydroxides. Environmental regulations, depending on the locale, can require that iron, copper and nickel ion content of waste solution be reduced from a few mg/l to a fraction of a mg/l of the waste solution before any waste can be discharged into a receiving stream. Present methods of disposal of such heavy metal containing wastes are expensive and troublesome such as contract disposal or the hauling of the waste to a site where approved secondary and tertiary treatment facilities are available.

This invention provides a relatively inexpensive and efficient process using environmentally acceptable chemicals to remove the iron, copper and nickel ions from an aqueous waste or process stream.

SUMMARY OF THE INVENTION

A method has been found using a combination of magnesium ion, a source of calcium hydroxide and a peroxygen compound for removing heavy metal ions from waste and process streams. More specifically, a method has been found wherein a combination of magnesium ion, calcium hydroxide and hydrogen peroxide will precipitate heavy metal ions such as iron, copper and nickel from an aqueous waste stream containing one or more of the ions where these ions are in a complexed water-soluble form with an organic complexing agent, or are present with one or more organic complexing agents.

DETAILED DESCRIPTION OF THE INVENTION

By complexing agent in this invention is meant any organic compound which forms a water-soluble tightly bound chemical complex with the heavy metal ions, iron, copper and nickel. Generally, these compounds have carboxylic acid, hydroxy or amine functionality both to complex with the metal ions and to solublize water-insoluble metal oxides or hydroxides in water. Such complexing agents usually are organic aromatic or aliphatic polyfunctional carboxylic, hydroxy or amino compounds where one or more of these functional groups may exist in a given complexing agent. Examples of organic complexing agents present in the waste or process streams to which the heavy metal ions can become bonded are one or more of organic polycarboxylic acids such as ethylenediaminetetraacetic acid, diethylenetriaminepentaacetic acid, citric acid, gluconic acid, pyromellitic acid, nitrilotriacetic acid, etc.

Any magnesium ion donor, for example, hydroxide, oxide, sulfate, carbonate, nitrate, chloride or bromide, can be used in the method of the invention. Magnesium compounds of high water solubility such as the sulfate, chloride or nitrate are preferred. It is also preferred that the magnesium compound not be in solid form but introduced as a solution or dispersion in water if only for better distribution in the waste solution. Magnesium ion is added to the waste at a minimum ratio of 0.05:1 by weight magnesium ion to total amount of iron, copper and nickel metal ion content. A chemical analysis of the waste should be used as an indicator. It is preferable to use 0.1 to 3:1 weight ratio of total magnesium to total amount of iron, copper and nickel. There is no upper limit to how much magnesium ions may be used. A weight ratio of magnesium to total content of iron, copper and nickel of more than 10:1 would probably be wasteful of the magnesium compound.

The calcium hydroxide or calcium oxide source may be any of the commercial grades available, may be of any strength and in powder form or an aqueous slurry or solution form. Hereinafter calcium hydroxide when used in the method of this invention will mean either calcium hydroxide or calcium oxide. Sodium hydroxide in combination with a soluble calcium salt in stoichiometric amounts may also be used to form calcium hydroxide in situ.

The calcium hydroxide is added to the waste in an amount sufficient to adjust the waste liquor to a pH of 10.2 to 12.5. A pH of less than about 10 is not sufficient to efficiently precipitate the iron, copper and nickel ions. A pH of greater than 12.5 is unnecessary and wasteful of the calcium hydroxide. If the waste stream is highly alkaline, for example, above pH 11, it would be advisable to reduce the pH with an acid to below about pH 9 before the addition of both the peroxygen and magnesium compounds.

Any suitable oxidizing agent can be used in the method of this invention including oxygen, ozone, air, hypochlorite, chlorine, permanganate, dichromate, hydrogen peroxide, peroxygen compounds, etc. Oxygen or air are economical, but they are relatively weak and therefore slow in oxidation of organics. Furthermore, use of oxygen or air generally requires costly aeration facilities, as well as a catalyst (such as manganese and copper ions) to promote oxidation. Ozone is relatively expensive and needs specialized equipment for its generation. For the average producer of complexed metal ion-containing waste, ozone treatment, for what is a seasonal or intermittent treatment situation, would probably have low cost-effectiveness. Oxidizing agents such as chlorine, hypochlorite, permanganate, dichromate, etc. are generally too powerful and indiscriminate in their oxidizing power and lead to high consumption in a given treatment. Also the by-products of such oxidations produce species which are undesirable in the waste, such as chlorinated organics, manganese hydroxide sludge, chromium ions, etc. Hydrogen peroxide or peroxygen source of hydrogen peroxide are preferred oxidizing agents as they are effective, easy to use and by-products are innocuous.

For the purposes of this invention, unless otherwise stated, peroxygen compound is expressed in terms of its active or available oxygen content. As those familiar with the art know, the active or available oxygen content is that oxygen in the molecule of the peroxygen compound which can be quantitatively determined by a standard redox titration such as iodometric, permanganate or ceric, etc. Based on this, a weight ratio of $H_2O_2$ to total organic carbon of 1:1 translates to a weight ratio of 0.47:1 of active oxygen in that $H_2O_2$. For monoperoxysulfuric acid, $H_2SO_5$, a 1:1 $H_2SO_5$:C weight ratio calculates to 0.14:1 based on the active oxygen content of $H_2SO_5$ molecule.

Hydrogen peroxide is the most preferred oxidizing agent. It is relatively economical and gives only innocuous by-products such as oxygenated organics, water and oxygen, the latter due to peroxide decomposition. Any of the following peroxygen compounds, for example, one or several of alkali metal percarbonates, perborates or perphosphates, may be used as a source of the peroxide oxidizing agent. Monopersulfates, particularly potassium monopersulfate, is another peroxygen source. Organic peroxy acids may be used, especially peroxyacetic acid. Monoperoxysulfuric acid is another specific source. The hydrogen peroxide can be any of the commercial grades available on the market. These commercial grades contain various types of stabilizers depending upon the end-use to which a particular grade is destined, but for the present invention, none of the stabilizers in these grades appear to have an adverse effect on this metal removal method.

Hydrogen peroxide can be added to the waste by any conventional means, e.g., pumping, etc., and it is preferable that it be diluted to a strength that can be handled safely. A concentrated hydrogen peroxide solution (35–70%) when contacting metal ions in waste will decompose at a faster rate because of its high strength. Though it is suggested to dilute the hydrogen peroxide to reduce any wasteful decomposition, the safe handling of the compound in this instance is more important than its chemical features.

Peroxygen compound, basis its active oxygen, is added to the waste at a ratio of 0.12:1 to 50:1 by weight of the total organic carbon content of the waste material. A ratio of 0.25:1 to 25:1 is preferred. A ratio of 0.5:1 to 5:1 is most preferred. There may be instances where the complexing of the metal ions in the waste or process stream may not be strong or complete and in such circumstances treatment of the streams with magnesium ions and calcium hydroxide may be equally effective to precipitate the heavy metal ions without the addition of a peroxide source. Where strong complexing has apparently occurred, significant improvement in the removal of iron, copper and nickel ions has been observed when hydrogen peroxide is added to the waste in addition to magnesium ions and calcium hydroxide.

The magnesium and the peroxide components of the precipitation composition may be added to the waste solution simultaneously or sequentially. It is preferable to add the magnesium first. It is suggested that the magnesium be added to the waste solution before the calcium hydroxide is added to the solution to adjust the pH. By adding magnesium ion before the addition of calcium hydroxide, a more uniform distribution of magnesium ion is assured. If magnesium ion were to be added following calcium hydroxide addition to the solution, there would be the possibility of magnesium hydroxide precipitating out of the system and the magnesium ion not giving maximum benefit of its presence for complete metals precipitation.

It is also preferable to add the hydrogen peroxide to the solution or stream to be treated, again before the calcium hydroxide is added to adjust the pH. Hydrogen peroxide is likely to be less stable in the waste or process stream system in a high pH environment and the result would be that the efficiency of oxidative effects would be decreased due to the increased rate of peroxide decomposition. There are no chemical or theoretical reasons to have any particular order of addition of the components to the stream to be treated. From an economic view, however, the above sequence is preferable.

The waste material should not be static. The precipitation composition is added to a well circulated or agitated waste material in a holding basin or pond or a tank to insure adequate contact of the magnesium, calcium hydroxide, peroxide combination and the waste to be treated before discharge of the waste.

The duration of the reaction time for treatment of the waste stream is important to the economics of the treatment method. The waste stream should be exposed to the well distributed magnesium, calcium hydroxide, peroxide combination for at least about 0.1 hour to obtain environmentally imposed levels of reduction in the heavy metal content. A residence time of 0.1 to 48 hours for the treated solution before filtration is preferred. A duration of 0.5 to 24 hours is most preferred.

Analytical data collected from laboratory samples has shown that several months after treatment of a waste material, if the precipitates have not been removed, some variation in levels of heavy metal content is detectable in the precipitate-free waste material. It is suspected that the phenomenon is reversed and a small part of the precipitates revert back into solution because of the new reaction equilibria set up by the complexing agent fragments.

The steps of separating, e.g., filtering the precipitates from the waste stream, may be carried out by any of the conventional separation processes.

Total iron, copper and nickel content of the waste solution treated and filtered by the method of this invention is less than 15 mg/l. In most instances the total iron, copper and nickel amount is less than 5 mg/l.

EXAMPLES

The following examples are offered to illustrate the method of the invention. The pHs were measured at 25° C. and the metals analyses were done by atomic absorption spectroscopy.

EXAMPLE 1

A waste solution from cleanout of a power plant steam boiler, containing citric acid (or its anion) as the complexing agent, and also containing ammonium hydroxide, ammonium carbonate and sodium nitrite as cleaning aids was treated in the following manner to remove Fe, Cu and Ni.

The total organic carbon (TOC) content of the solution was determined to be 1.08%, corresponding to a citrate trinegative anion content (total bound and free) of approximately 2.84%.

The initial pH of the waste solution was 9.1 at 25° C. The Fe, Cu, Ni contents were found to be 2260, 334 and 33 mg/l respectively, giving the total of 2627 mg/l for Fe+Cu+Ni ions. Reagents in the amounts given in Table 1 were added to 25 ml of the original waste solution in the following order: (1) water, (2) 5% $MgSO_4$ solution, (3) 1% $H_2O_2$ solution and finally (4) solid $Ca(OH)_2$. The solution was stirred briskly throughout the treatment. After the $Ca(OH)_2$ addition, the mixture was stirred for 30 minutes and filtered through a fritted disc vacuum funnel. pHs were measured after the treatment. All precipitates were weighted after filtration.

The amounts of $Mg++$ and $H_2O_2$ added, and the weight ratios of $Mg++/Fe+Cu+Ni$ and $H_2O_2/TOC$ refer to the 100 ml solution used in each experiment before $Ca(OH)_2$ treatment.

Results given in table I show that the system representing Experiment III, containing $Mg++$, $H_2O_2$ and $Ca(OH)_2$ shows a significantly more efficient precipitation and removal of $Fe+Cu+Ni$. Systems lacking in either $Mg++$ or $H_2O_2$ (Experiments II, IV) or both (Experiment I) are inferior to III as seen from the total metals content of the filtrate.

Comparison of III and I shows that a combination of $Mg+++H_2O_2+Ca(OH)_2$ at a lower pH (11.0) is vastly superior to $Ca(OH)_2$ alone at a higher pH (11.4). This comparison shows a smaller amount of $Ca(OH)_2$ can be used to achieve better or equal results with the preferred system.

Comparison of III and IV shows that at about equivalent pHs (11 and 11.3) a system with $Mg+++H_2O_2+Ca(OH)_2$ (III) is far better than a system with $H_2O_2+Ca(OH)_2$ but no $Mg++$ (IV).

The same pattern is repeated in the weights of the precipitates, in that the preferred system III gives a much larger amount of the dry water insoluble precipitate than the rest.

EXAMPLE 2

This experiment was run with a synthetic mixture of Fe, Cu, Ni metal compounds and citric acid in the solution to be treated.

The reagents used were: citric acid monohydrate ($C_6H_8O_7.H_2O$, F. Wt. 210.14), anhydrous $CuSO_4$ (F. Wt. 159.60), $NiSO_4.6H_2O$ (F.Wt. 262.87), $FeSO_4.7H_2O$ (F. Wt. 278.03).

The aqueous solution to be treated was prepared from the above ingredients so as to contain 50 mg/l Fe, 40 mg/l Cu and 30 mg/l Ni. A 30% stoichiometric excess of citric acid monohydrate (CA) was used, ie., (2CA:3Cu, 2CA:3Fe, 2CA:3Ni) times 1.3. This amounted to 371 mg/l citric acid monohydrate. This corresponded to 127.1 mg/l of organic carbon in the synthetic waste solution to be treated.

To 200 ml of the above solution, the following ingredients were added in this order: (1) 0.204 gm. of $MgSO_4$, $7H_2O$ solid and after complete solution, (2) $Ca(OH)_2$ to adjust the pH to 11.0. A control experiment was run in which $MgSO_4$, $7H_2O$ was not added. Table II shows experimental details.

The above mixtures were stirred for 15 minutes after pH adjustment, then left approximately 16 hours to settle without stirring. After 16 hours, the solutions were filtered through a fritted disc vacuum funnel.

Filtrate from Experiment II was water clear, while filtrate from I was pale brown.

The Fe, Cu and Ni analyses of the filtrates are given in Table II.

The combination of $Mg++$ and $Ca(OH)_2$, represented by Experiment II did a much better job of Fe, Cu, Ni removal.

TABLE I

| Experiment | Boiler Waste Soln. (ml) | Distilled Water (ml) | 5% $MgSO_4$ Soln. (ml) | 1% $H_2O_2$ Soln. (ml) | Total Volume (ml) | pH after $Ca(OH)_2$ Addition and 30' Stirring | Amounts (mg/l) in 100 ml Treated Solution Before $Ca(OH)_2$ Addition $Mg^{++}$ | $H_2O_2$ | Weight Ratios in 100 ml of Treated Solution before $Ca(OH)_2$ Addition $\frac{Mg^{++}}{Fe+Cu+Ni}$ | $\frac{H_2O_2}{Organic Carbon}$ |
|---|---|---|---|---|---|---|---|---|---|---|
| (Boiler Waste Solution) | — | — | — | — | — | — | — | — | — | — |
| (Calculated metal content of the diluted solution to be treated) | — | — | — | — | — | — | — | — | — | — |
| I | 25 | 75 | 0 | 0 | 100 | 11.4 | 0 | 0 | 0 | 0 |
| II | 25 | 55 | 20 | 0 | 100 | 11.3 | 2019.4 | 0 | 0.2324 | 0 |
| III | 25 | 25 | 20 | 30 | 100 | 11.0 | 2019.4 | 3000 | 0.2324 | 1.11 |
| IV | 25 | 45 | 0 | 30 | 100 | 11.3 | 0 | 3000 | 0 | 1.11 |

| Experiment | Filtrate Metal Analyses (mg/l) Fe | Cu | Ni | Total | Results Precipitate Weight (gm) Wet Cake | Dried 48 Hr. in Ambient Air |
|---|---|---|---|---|---|---|
| (Boiler Waste Solution) | 2260 | 334 | 33 | 2627 | — | — |
| (Calculated metal content of the diluted solution to be treated) | 565 | 83.5 | 8.25 | 656.75 | — | — |
| I | 87 | 41.2 | 3.53 | 131.73 | 2.18 | 0.6 |
| II | 6.75 | 13.1 | 1.06 | 20.91 | 6.07 | 1.43 |
| III | 2.05 | 10.9 | 0.78 | 13.73 | 6.0 | 1.85 |
| IV | 56.0 | 27.4 | 2.64 | 86.04 | 3.28 | 0.58 |

TABLE II

| Experiment | $Mg^{++}$ mg/l | Solid Ca(OH)$_2$ (~0.1-.2 gm) | pH after 15' of Stirring | Start Fe mg/l | Cu mg/l | Ni mg/l | Fe + Cu + Ni mg/l | $\frac{Mg}{Fe + Cu + Ni}$ Wt. Ratio | Finish Fe mg/l | Cu mg/l | Ni mg/l | Fe + Cu + Ni mg/l |
|---|---|---|---|---|---|---|---|---|---|---|---|---|
| I | 0 | Yes | 11.0 | 50 | 40 | 30 | 120 | 0 | 9.05 | 9.75 | 0.84 | 19.84 |
| II | 100 | Yes | 11.0 | 50 | 40 | 30 | 120 | 0.833 | 1.8 | 0.9 | 0.01 | 2.71 |

EXAMPLE 3

This experiment was essentially a repeat of Example 2, except that instead of citric acid, disodium salt of ethylenediaminetetraacetic acid (Na$_2$EDTA, 2H$_2$O, m. wt. 372.24) was used as the complexing agent.

Solution containing 50 mg/l Fe, 40 mg/l Cu and 30 mg/l nickel and 1000 mg/l Na$_2$EDTA was treated for Fe, Cu and Ni precipitation and removal. Na$_2$EDTA used, expressed as EDTA tetranegative anion (F. wt. 288.24), was 774 mg/liter, which was 263% of the stoichiometric amount calculated for complexation of EDTA with the Fe, Cu and Ni metal ions, basis (EDTA)$_1$ (Fe, Cu or Ni)$_2$. This corresponds to an organic carbon content of 322 mg/l.

Results are given in Table III.

As seen from the results, the metal precipitant system comprising H$_2$O$_2$, Mg++ and Ca(OH)$_2$ (Experiment IV) was superior to the rest. Furthermore, sodium hydroxide was inferior to calcium hydroxide as the alkaline ingredient of the precipitant system.

pressed as EDTA tetra anion, (from Na$_2$EDTA, 2H$_2$O). The organic carbon content from the EDTA amounted to 628.6 mg/l.

In the experiments tabulated in Table IV, 281.1 mg/l of Mg++ (from MgSO$_4$, 7H$_2$O) and 3978 mg/l of H$_2$O$_2$ (from a 5.1% H$_2$O$_2$ solution) were also used as indicated. For alkalinizing, both solid Ca(OH)$_2$ and an approximate 0.5 N NaOH solution were used.

To 200 ml of the synthetic waste solution containing the metal ions and EDTA, were added in that order MgSO$_4$ solution, H$_2$O$_2$ solution and the alkali as shown in Table IV. Enough alkali was added to increase the pH of the waste solution from about 3-4 to 12.0. After the addition of the alkali, the mixture was stirred for about 15 minutes, the pH measured and the mixture vacuum filtered through a coarse porosity fritted disc funnel under vacuum. The treatment was carried out at the ambient temperature of approximately 25° C.

The filtrate was analyzed for Fe, Cu and Ni content by atomic absorption spectrophotometry.

The results are given in Table IV. Again, at a pH of

TABLE III

| Experiment | H$_2$O$_2$ mg/l | $Mg^{++}$ mg/l | Solid Ca(OH)$_2$ ~0.1-0.2 gm | ~0.5N NaOH Solution ~2 ml | pH after 15' Stirring | Start Fe mg/l | Cu mg/l | Ni mg/l | Fe + Cu + Ni mg/l | Wt. Ratio $\frac{Mg}{Fe + Cu + Ni}$ | Wt. Ratio $\frac{H_2O_2}{Carbon}$ |
|---|---|---|---|---|---|---|---|---|---|---|---|
| I | 0 | 0 | Yes | No | 11.0 | 50 | 40 | 30 | 120 | 0 | 0 |
| II | 1000 | 0 | Yes | No | 11.0 | 50 | 40 | 30 | 120 | 0 | 3.1 |
| III | 0 | 100 | Yes | No | 11.0 | 50 | 40 | 30 | 120 | 0.833 | 0 |
| IV | 1000 | 100 | Yes | No | 11.0 | 50 | 40 | 30 | 120 | 0.833 | 3.1 |
| V | 1000 | 100 | No | Yes | 11.0 | 50 | 40 | 30 | 120 | 0.833 | 3.1 |

| | Finish | | | |
|---|---|---|---|---|
| Experiment | Fe mg/l | Cu mg/l | Ni mg/l | Fe + Cu + Ni mg/l |
| I | 2.0 | 17.2 | 5.84 | 25.04 |
| II | 3.35 | 6.1 | 5.56 | 15.01 |
| III | 3.20 | 8.25 | 4.13 | 15.58 |
| IV | 0.9 | 2.0 | 4.4 | 7.3 |
| V | 3.45 | 19.7 | 5.42 | 28.57 |

EXAMPLE 4

A synthetic waste solution was made by incorporating 50 mg/l of Fe (from a stock FeSO$_4$, 7H$_2$O solution), 40 mg/l Cu (from CuSO$_4$ solution), 30 mg/l Ni (from NiSO$_4$, 6H$_2$O solution) and 1510 mg/l EDTA, ex- 12, there was excellent removal of Fe, Cu and Ni, as a result of the Mg+++H$_2$O$_2$+Ca(OH)$_2$ treatment. Also as in previous examples, NaOH as an alkali was inferior to Ca(OH)$_2$ for the insoluble metal precipitate formation.

TABLE IV

| Experiment | $Mg^{++}$ mg/l | H$_2$O$_2$ mg/l | Solid Ca(OH)$_2$ (~0.1-0.2 gm) | NaOH Solution (~2 ml) | pH After 15' Stirring | Start Fe mg/l | Cu mg/l | Ni mg/l | Fe + Cu + Ni mg/l | Weight Ratio $\frac{Mg}{Fe + Cu + Ni}$ | Weight Ratio $\frac{H_2O_2}{Organic\ Carbon}$ |
|---|---|---|---|---|---|---|---|---|---|---|---|
| I | 0 | 0 | Yes | No | 12.0 | 50 | 40 | 30 | 120 | 0 | 0 |
| II | 0 | 3978 | Yes | No | 12.0 | 50 | 40 | 30 | 120 | 0 | 6.31 |
| III | 281.1 | 0 | Yes | No | 12.0 | 50 | 40 | 30 | 120 | 2.34 | 0 |
| IV | 281.1 | 3978 | Yes | No | 12.0 | 50 | 40 | 30 | 120 | 2.34 | 6.31 |
| V | 281.1 | 3978 | No | Yes | 12.0 | 50 | 40 | 30 | 120 | 2.34 | 6.31 |

TABLE IV-continued

| | | Finish Filtrate Metals Analysis | | |
|---|---|---|---|---|
| Experiment | Fe mg/l | Cu mg/l | Ni mg/l | Fe + Cu + Ni mg/l |
| I | 3.1 | 4.05 | 13.7 | 20.85 |
| II | 3.05 | 1.9 | 3.7 | 8.65 |
| III | 0.75 | 1.7 | 9.57 | 12.02 |
| IV | 0.45 | 0.7 | 2.82 | 3.97 |
| V | 0.3 | 19.9 | 9.93 | 30.13 |

Industrial Applicability

The present invention specifically provides a process for cleaning waste streams from, for example, steam boilers of power, chemical and nuclear plants in an efficient, economical and environmentally safe manner. This technology has broader applications also in such areas as mining, food processing, metal and plating processing and electronic materials manufacturing.

I claim:

1. Method for removing from a aqueous waste or process stream heavy metal ions selected from iron, copper and nickel present in complexed water-soluble form comprising contacting with agitation said waste or process stream for a residence time of at least 0.1 hour at a pH adjusted to between about 10.2 and 12.5 with a magnesium ion donor compound, a peroxygen compound and either calcium hydroxide or calcium oxide so as to form derivatives of said heavy metal ions which precipitate, and removing said precipitate from the waste or process stream, leaving a total content of iron, copper and nickel of less than 15 mg/l in the treated aqueous waste, said magnesium compound being present, basis magnesium, in a minimum ratio of 0.05:1 by weight the total weight of iron, copper and nickel, and said peroxygen compound being present, on the basis of active oxygen, at a weight ratio of 0.12:1 to 50:1 of the total weight or organic carbon in the waste stream.

2. Method of claim 1 wherein the magnesium compound is selected from magnesium sulfate, bromide, chloride, nitrate, hydroxide, oxide and carbonate.

3. Method of claim 1 wherein the magnesium compound is magnesium sulfate.

4. Method of claim 1 wherein the peroxygen compound is hydrogen peroxide.

5. Method of claim 1 wherein the peroxygen compound is potassium monopersulfate.

6. Method of claim 1 wherein the peroxygen compound is peroxyacetic acid.

7. Method of claim 1 wherein the peroxygen compound is monoperoxysulfuric acid.

8. Method of claim 1 wherein the peroxygen compound is one or several of alkali metal percarbonates, perborates and perphosphates.

9. Method of claim 1 wherein the magnesium is present in a ratio of 0.1 to 3:1 by weight of total amount of iron, copper and nickel.

10. Method of claim 1 wherein peroxygen compound, basis active oxygen, is present at a weight ratio of 0.25:1 to 25:1 of the total organic carbon content of said stream.

11. Method of claim 1 wherein peroxygen compound, basis active oxygen, is present at a weight ratio of 0.5:1 to 5:1 of the total organic carbon content of the waste stream.

12. Method of claim 1 wherein said residence time is 0.1 to 48 hours.

13. Method of claim 1 wherein said residence time is 0.5 to 24 hours.

14. Method of removing from an aqueous waste stream heavy metal ions selected from iron, copper and nickel present in complexed water-soluble form comprising contacting with agitation said stream at a pH adjusted to between 10.2 to 12.5 with magnesium sulfate present, basis magnesium, at a minimum ratio of 0.05:1 by weight of the total amount of iron, copper and nickel; hydrogen peroxide, basis active oxygen, present at a weight ratio of 0.12:1 to 50:1 of the total organic carbon content of said stream; and calcium hydroxide and, after a residence time of 0.1 to 48 hours, removing the precipitated ions from said stream leaving a total content of iron, copper and nickel of less than 15 mg/l.

15. Method for removing from an aqueous waste or process stream heavy metal ions selected from iron, copper and nickel present in complexed water-soluble form comprising contacting with agitation said stream at a pH adjusted to between 10.2 and 12.5 with a magnesium ion donor compound and either calcium hydroxide or calcium oxide and, after a residence time of at least 0.1 hour, removing the precipitated ions from said stream, leaving a total content of iron, copper and nickel of less than 15 mg/l, said magnesium compound being present, basis magnesium, in a minimum ratio of 0.05:1 by weight of the total weight of iron, copper and nickel, and said peroxygen compound being present, on the basis of active oxygen, at a weight ratio of 0.12:1 to 50:1 of the total weight of organic carbon in said stream.

* * * * *